United States Patent
Newman et al.

(10) Patent No.: US 6,935,169 B2
(45) Date of Patent: *Aug. 30, 2005

(54) TIRE PRESSURE SENSOR ARRAY

(75) Inventors: Robert A. Newman, El Paso, TX (US); Francisco J Sanchez, El Paso, TX (US); Lorenzo Guadalupe Rodriguez, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 81 days.

This patent is subject to a terminal disclaimer.

(21) Appl. No.: 10/281,616

(22) Filed: Oct. 28, 2002

(65) Prior Publication Data

US 2004/0079144 A1 Apr. 29, 2004

(51) Int. Cl.[7] ............................................. G01M 17/02
(52) U.S. Cl. .......................... 73/146; 73/146.5; 340/442
(58) Field of Search .............................. 73/146, 146.2, 73/146.3, 146.4, 146.5, 146.8; 340/447, 442, 444

(56) References Cited

U.S. PATENT DOCUMENTS

| | | | |
|---|---|---|---|
| 5,559,484 A | * | 9/1996 | Nowicki et al. ............ 340/447 |
| 6,089,098 A | * | 7/2000 | Tylisz et al. ................... 73/722 |
| 6,161,905 A | | 12/2000 | Hac et al. |
| 6,175,301 B1 | * | 1/2001 | Piesinger ..................... 340/442 |
| 6,194,678 B1 | * | 2/2001 | Yoshikawa et al. .......... 200/512 |
| 6,271,748 B1 | * | 8/2001 | Derbyshire et al. .......... 340/442 |
| 6,359,556 B1 | * | 3/2002 | Katou ......................... 340/506 |
| 6,369,703 B1 | | 4/2002 | Lill |
| 6,453,897 B1 | * | 9/2002 | Kanno ......................... 123/684 |
| 6,481,806 B1 | | 11/2002 | Krueger et al. |
| 6,486,776 B1 | * | 11/2002 | Pollack et al. .............. 340/521 |
| 6,580,364 B1 | * | 6/2003 | Munch et al. .............. 340/447 |
| 6,639,165 B1 | * | 10/2003 | Newman et al. .......... 200/83 Y |

* cited by examiner

*Primary Examiner*—William Oen
*Assistant Examiner*—Andre Allen
(74) *Attorney, Agent, or Firm*—Jimmy L. Funke

(57) ABSTRACT

A tire pressure sensor array includes a control module to which a receiver is connected. Four tire pressure sensors communicate with the control module via the receiver. Each tire pressure sensor includes a pressure switch that is electrically connected to a digital state machine. The digital state machine is connected to a transmitter and communicates pressure information to the transmitter. In turn, the transmitter communicates the pressure information to the receiver which communicates the pressure information to the control module.

13 Claims, 2 Drawing Sheets

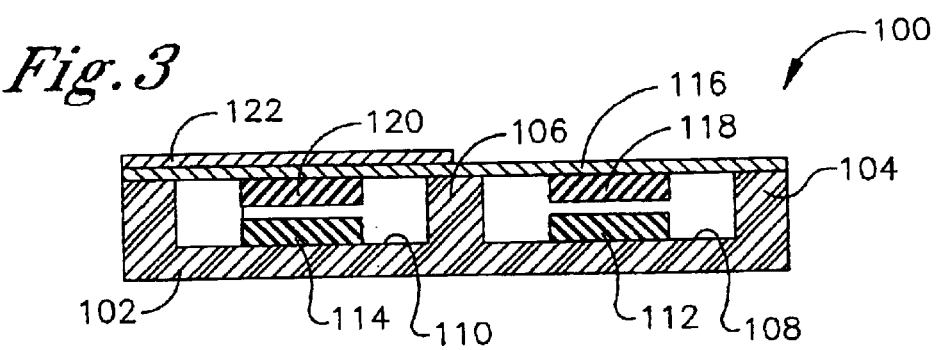
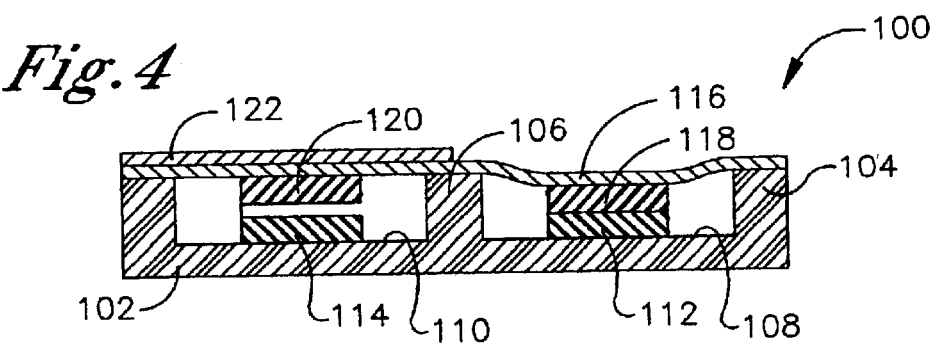
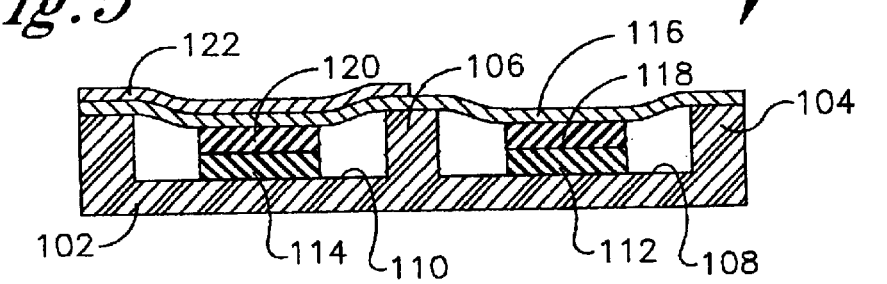
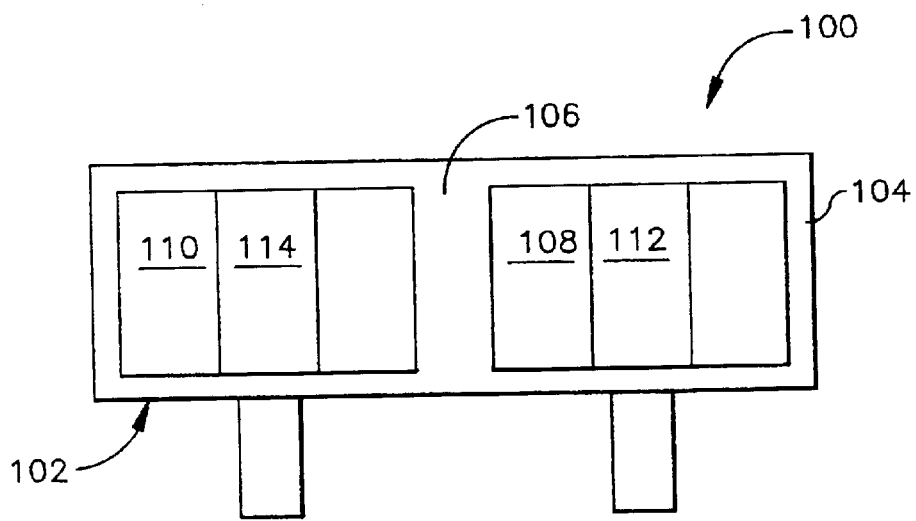

US 6,935,169 B2

TIRE PRESSURE SENSOR ARRAY

TECHNICAL FIELD

The present invention relates generally to tire pressure sensors.

BACKGROUND OF THE INVENTION

Tire pressure sensors are standard equipment on many vehicles manufactured today. The tire pressure sensors can alert drivers when the tire air pressure becomes dangerously low. A typical tire pressure sensor system includes a pressure transducer that converts pressure into analog output. This type of system can measure absolute and/or gauge pressure and deliver a pressure reading to a central unit via radio frequency (RF) communication.

Typically, this system includes one tire pressure sensor per tire, i.e., four or five sensors. In order to have a relatively long operating life, this system needs one or more relatively large capacity batteries, e.g., one per sensor. Typically, the battery is permanently attached to the sensor circuit board and installed in the sensor housing to protect it from the relatively harsh environment within the tire. Unfortunately, due to the limited life of the batteries, the sensors connected thereto have relatively short lives and must be replaced over the life of the vehicles in which the sensors are installed. Changing the sensors can be very labor intensive because often the tire must be removed from the wheel in order to access the sensors.

The present invention has recognized these prior art drawbacks, and has provided the below-disclosed solutions to one or more of the prior art deficiencies.

SUMMARY OF THE INVENTION

A tire pressure sensor array includes a control module and a receiver electrically connected to the control module. Four or more tire pressure sensors communicate with the control module via the receiver. Each tire pressure sensor includes a pressure switch that generates a pressure signal. The pressure signals are wirelessly transmitted to the receiver.

In a preferred embodiment, each pressure switch is electrically connected to a digital state machine that is connected to a transmitter. The pressure switch provides digital signals to the digital state machine based on predetermined pressure levels. Preferably, the digital state machine detects digital inputs from the pressure switch and generates digital signals representing pressure information.

Also, in a preferred embodiment, the digital state machine communicates the pressure information to the transmitter, the transmitter communicates the pressure information to the receiver, and the receiver communicates the pressure information to the control module. Preferably, the pressure switch includes a plate and a rib that extends from the plate to establish a cavity on the plate. Two lower contacts are disposed on the plate within the cavity and a diaphragm is disposed on the rib to enclose the cavity. Further, two upper contacts are disposed on the diaphragm directly above the lower contacts. In a preferred embodiment, the pressure switch is movable between an open position wherein the upper contacts do not engage the lower contacts, a first closed position wherein one upper contact engages one lower contact, and a second closed position wherein each upper contact engages a respective lower contacts.

Preferably, the pressure switch further includes a central rib that extends from the plate. The central rib divides the cavity into a first cavity and a second cavity. A first lower contact is disposed within the first cavity and a second lower contact is disposed within the second cavity. In a preferred embodiment, the diaphragm is a first diaphragm that encloses the first cavity and the second cavity. A second diaphragm is affixed to the first diaphragm such that is spans the area above the second cavity. Moreover, the pressure switch includes a first upper contact that is affixed to the first diaphragm above the first lower contact and a second upper contact that is affixed to the first diaphragm above the second lower contact.

Preferably, the pressure switch is movable between an open position wherein the upper contacts do not engage the lower contacts, a first closed position wherein the first upper contact engages the first lower contact, and a second closed position wherein the first upper contact continues to engage the first lower contact and wherein the second upper contact engages the second lower contact.

The present invention will now be described, by way of example, with reference to the accompanying drawings, in which:

BRIEF DESCRIPTION OF THE DRAWINGS

FIG. 3 is a cross-section view of a pressure switch in the open position;

FIG. 4 is a cross-section view of the pressure switch in the first closed position;

FIG. 5 is a cross-section view of a pressure switch in the second closed position; and FIG. 6 is a top plan view of the pressure switch with the diaphragm and upper contacts removed for clarity.

DESCRIPTION OF AN EMBODIMENT OF THE INVENTION

Figure 1:
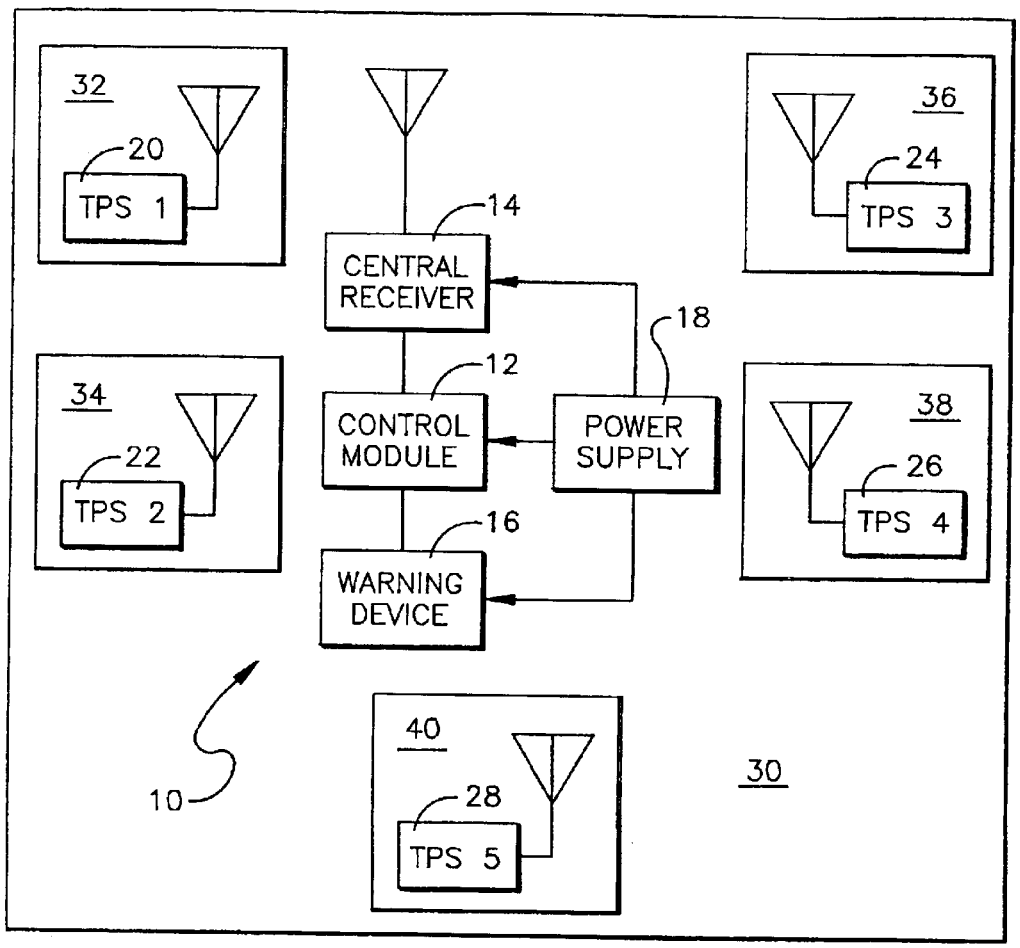
FIG. 1 is a block diagram of a tire pressure sensor array.

Referring initially to FIG. 1, a tire pressure sensor array is shown and designated 10. FIG. 1 shows that the tire pressure sensor array includes a control module 12, e.g., a body control module (BCM) or vehicle control module (VCM) to which a central receiver 14 and an output device 16 are attached. Preferably, the central receiver 14 is an RF receiver. Moreover, in a preferred embodiment, the output device 16 is a lamp that can be illuminated to warn a driver of low tire pressure. It is to be appreciated that the output device 16 can be a gauge, a buzzer, or any other type of audio or visual indicator.

As shown in FIG. 1, a power source 18 is connected to the control module 12, the central receiver 14 and the output device 16. FIG. 1 also shows that the sensor array 10 includes a first tire pressure sensor 20, a second tire pressure sensor 22, a third pressure sensor 24, a fourth tire pressure sensor 26, and a fifth tire pressure sensor 28 that communicate with the central receiver via Rf.

FIG. 1 shows that the sensor array 10 is installed in a vehicle 30. Specifically, each tire pressure sensor 20, 22, 24, 26, 28 is installed in a respective tire/wheel assembly 32, 34, 36, 38, 40 (four tire/wheel assemblies and a spare) such that each tire pressure sensor 20, 22, 24, 26, 28 can sense the air pressure within a respective tire and send a signal related to the air pressure within the tire to the central receiver 14.

Figure 2:
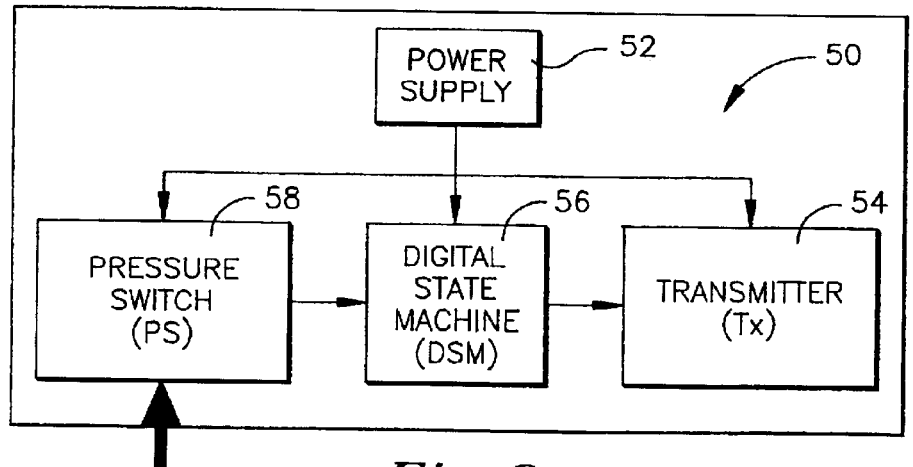
FIG. 2 is a block diagram of a tire pressure sensor.

Referring to FIG. 2, an exemplary tire pressure sensor is shown and designated 50. It is to be understood that each tire pressure sensor 20 comprising the sensor array 10 is identical in construction to the tire pressure sensor 50 shown in FIG. 2. FIG. 2 shows that the tire pressure sensor 50 includes a power supply 52, e.g., a battery, a thin film fuel cell, etc. An RF transmitter (Tx) 54, a digital state machine (DSM) 56 and a normally open, pressure switch 58 are electrically connected to the power supply 50. As shown, the pressure switch 58 is connected to the DSM 56 which, in turn, is connected to the Tx 54.

The pressure switch 58 provides digital signals to the DSM 56 based on predetermined pressure levels. Specifically, the pressure switch 58 can provide multiple signals with each signal being related to a predetermined pressure level. The number of signals are defined and limited by the pressure switch 58, e.g., the number of trip points and the actuating pressures.

Preferably, the DSM 56 can detect and decode digital inputs from the pressure switch 58 and generate a digital signal representing pressure information. Also, the DSM 56 can manage battery life with a predefined signal transmission-timing scheme, i.e., the tire pressure sensors 20, 22, 24, 26, 28 are energized at predetermined time intervals to sends signals to the central receiver 14. In a preferred embodiment, the DSM 56 can also generate a diagnostic message to indicate continuous functionality while the tire pressure is in the appropriate range. This diagnostic message can be presented to the driver, e.g., via the output device 16. Moreover, the DSM 56 can contain and attach unique identifications (IDs) to the messages and enable the RF Tx 54 to send pressure information and/or diagnostic information to the central receiver 14. The Tx 54 can transmit the data using any modulation technique, e.g., amplitude shift keying (ASK) modulation, frequency shift keying (FSK) modulation, etc. at any frequency. It is to be understood that the DSM 56 can be implemented using an application specific integrated circuit (ASIC).

Referring to FIGS. 3–6, a exemplary, non-limiting pressure switch is shown and generally designated 100. In a preferred embodiment, the pressure switch 100 is manufactured using micro-electro-mechanical systems (MEMS) technology which offers the most reliable method for building the pressure switch 100, described in detail below.

FIGS. 3–6 show that the pressure switch 100 includes a preferably glass, flat, rectilinear plate 102 having a peripheral rib 104 extending from the upper surface of the plate 102 around the outer periphery of the upper surface. A central rib 106 extends from one side of the peripheral rib 104 to the opposite side of the peripheral rib 104 to establish a first cavity 108 and second cavity 110 above the plate 102 within the confines of the peripheral rib 104.

As shown in FIGS. 3–6, a preferably gold first lower contact 112 is affixed to the upper surface of the plate 102 within the first cavity 108 and extends from within the first cavity 108 through the peripheral rib 104. Also, a preferably gold second lower contact 114 is affixed to the upper surface of the plate 102 within the second cavity 110 and extends from within the second cavity 110 through the peripheral rib 104.

FIGS. 3–5 show that a preferably resilient, first diaphragm 116 is disposed on top of the peripheral rib 104 and the central rib 106 so that it completely encloses the first cavity 108 and the second cavity 110. Moreover, a first upper contact 118 is attached to the interior surface of the diaphragm 116 directly above the first lower contact 112. Also, a second upper contact 120 is attached to the interior surface of the first diaphragm 116 above the second lower contact 114 so that it can engage the second lower contact, as described below. FIGS. 3–5 also show that in a preferred embodiment, a preferably resilient, second diaphragm 122 is installed over a portion of the first diaphragm 116, specifically over the second cavity 110. This effectively increases the thickness of diaphragm material over the cavity and as described below, increases the pressure required to engage the second upper contact 120 with the second lower contact 114.

It is to be understood that as the external pressure increases, the pressure switch 100 moves between an open position shown in FIG. 3, a first closed position shown in FIG. 4, and a second closed position shown in FIG. 5. Specifically, as the pressure overcomes the stiffness of the first diaphragm 116 over the first cavity 108 the first diaphragm 116 is pushed into the first cavity 108 until the first upper contact 118 engages the first lower contact 112 such that the pressure switch 100 is in the first closed position. Moreover, as the pressure continues to increase and overcomes the combined stiffness of the first diaphragm 116 and the second diaphragm 122 over the second cavity 110, the first diaphragm 116 and the second diaphragm 122 are pushed into the second cavity 110 until the second upper contact 120 engages the second lower contact 114 such that the pressure switch 100 is in the second closed position.

The pressure switch 100 can be installed in a pressurized environment, e.g., a tire. Accordingly, as the pressure decreases in the tire, e.g., due to a hole in the tire, the second upper contact 120 will disengage the second lower contact 114 and open a circuit causing a warning to be sent to a driver. As the pressure continues to decrease, the first upper contact 118 will disengage the first lower contact 112 and open another circuit causing a second warning to be sent to the driver. Accordingly, it can be appreciated that the pressure switch 100 detects decreasing fluid pressure in addition to increasing fluid pressure. It is to be understood that the pressure switch 100 can have more than two cavities and with each additional cavity the overall diaphragm thickness above each additional cavity is increase incrementally. Further, the pressure switch 100, e.g., the contacts 112, 114, 118, 120 can be integrated with an application specific integrated circuit (ASIC). It is to be understood that pressure switch 100 may only include one pair of contacts, e.g., the first lower contact 112 and first upper contact 118, and one cavity, e.g., the first cavity 108. With this configuration, the pressure switch 100 is either open or closed.

Accordingly, with the configuration of structure described above, it is to be appreciated that the tire pressure sensor array 100 can provide tire pressure information from individual tires 32, 34, 36, 38, 40. Also, since each sensor 32, 34, 36, 38, 40 uses a passive sensing element, i.e., the pressure switch 58, that is normally open, the current required to power each sensor 32, 34, 36, 38, 40 is minimized and the size of the sensor power supply 50 is minimized.

While the particular TIRE PRESSURE SENSOR ARRAY as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A tire pressure sensor array, comprising:
   a control module;
      at least one receiver electrically connected to the control module; and
   at least four tire pressure sensors in communication with the control module via the receiver, each tire pressure sensor including a pressure switch generating a digital pressure signal at a predetermined pressure level, a digital state machine electrically connected to the pressure switch for receiving said digital pressure signal and providing a digital signal representing pressure information, and a transmitter connected to the digital state machine for receiving the pressure information and wirelessly transmitting said pressure information to the receivers;
   wherein each pressure switch comprises
   a plate;
   a rib extending from the plate to establish at least one cavity on the plate;
   at least two lower contacts disposed on the plate within the cavity;
   at least one diaphragm disposed on the rib and enclosing the cavity; and
   at least two upper contacts disposed on the diaphragm above the second lower contact, the pressure switch movable between an open position wherein the upper contacts do not engage the lower contacts, a first closed position wherein one upper contact engages one lower contact, and a second closed position wherein each upper contact engages a respective lower contact.

2. The tire pressure sensor array of claim 1, wherein the pressure switch further comprises:
   a central rib extending from the plate, the central rib dividing the cavity into a first cavity and a second cavity;
   a first lower contact disposed within the first cavity; and
   a second lower contact disposed within the second cavity.

3. The tire pressure sensor array of claim 2, wherein the diaphragm is a first diaphragm that encloses the first cavity and the second cavity and the switch further comprises:
   a second diaphragm affixed to the first diaphragm, the second diaphragm spanning the area above the second cavity.

4. The tire pressure sensor array of claim 3, wherein the pressure switch further comprises:
   a first upper contact affixed to the first diaphragm above the first lower contact; and
   a second upper contact affixed to the first diaphragm above the second lower contact.

5. The tire pressure sensor array of claim 4, wherein the pressure switch is movable between an open position wherein the upper contacts do not engage the lower contacts, a first closed position wherein the first upper contact engages the first lower contact, and a second closed position wherein the first upper contact continues to engage the first lower contact and wherein the second upper contact en ages the second lower contact.

6. A tire pressure sensor array, comprising:
   a control module;
      at least one receiver electrically connected to the control module; and at least four tire pressure sensors in communication with the control module via the receiver, each tire pressure sensor including at least one pressure switch that includes at least one cavity, at least one lower contact disposed within e cavity, at least one diaphragm enclosing the cavity, and at least one upper contact disposed on the diaphragm above the lower contact
      wherein each pressure switch includes at least one cavity, at least two lower contacts disposed within the cavity, at least one diaphragm enclosing the cavity, and at least two upper contacts disposed on the diaphragm above the lower contacts; and
      wherein each pressure switch is movable between an open position wherein the upper contacts do not engage the lower contacts, a first closed position wherein one upper contact engages a respective lower contact, and a second closed position wherein each upper contact engages a respective lower contact.

7. The tire pressure sensor array of claim 6, wherein the pressure switch comprises:
   a first cavity and a second cavity;
   a first lower contact disposed within the first cavity; and
   a second lower contact disposed within the second cavity.

8. The tire pressure sensor array of claim 7, wherein the diaphragm is a first diaphragm that encloses the first cavity and the second cavity an the pressure switch further comprises:
   a second diaphragm affixed to the first diaphragm, the second diaphragm spanning the area above the second cavity.

9. The tire pressure sensor array of claim 8, wherein the pressure switch comprises:
   a first upper contact affixed to the first diaphragm above the first lower contact; and
   a second upper contact affixed to the first diaphragm above the second lower contact.

10. The tire pressure sensor array of claim 6, wherein each pressure switch is electrically connected to a digital state machine that is connected to a transmitter.

11. The tire pressure sensor array of claim 10, wherein the pressure switch provides digital signals to the digital state machine based on at least one predetermined pressure level.

12. The tire pressure sensor array of claim 11, wherein the digital state machine detects digital inputs from the pressure switch and generates digital signals representing pressure information.

13. The tire pressure sensor array of claim 12, wherein the digital state machine communicates the pressure information to the transmitter, the transmitter communicates the pressure information to the receiver, and the receiver communicates the pressure information to the control module.

* * * * *